(12) United States Patent
Creusen et al.

(10) Patent No.: US 10,208,915 B2
(45) Date of Patent: Feb. 19, 2019

(54) THERMAL FUNCTION OF HEADLIGHT SEALING CAP

(71) Applicant: KONINKLIJKE PHILIPS N.V., Eindhoven (NL)

(72) Inventors: Martinus Petrus Creusen, San Jose, CA (US); Lukas Kuepper, San Jose, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

(21) Appl. No.: 14/907,894

(22) PCT Filed: Jul. 9, 2014

(86) PCT No.: PCT/EP2014/064741
§ 371 (c)(1),
(2) Date: Jan. 27, 2016

(87) PCT Pub. No.: WO2015/014585
PCT Pub. Date: Feb. 5, 2015

(65) Prior Publication Data
US 2016/0169472 A1    Jun. 16, 2016

(30) Foreign Application Priority Data

Jul. 30, 2013    (EP) .................................... 13178539

(51) Int. Cl.
*B60Q 1/00* (2006.01)
*F21S 45/47* (2018.01)
(Continued)

(52) U.S. Cl.
CPC .............. *F21S 45/47* (2018.01); *B60Q 1/007* (2013.01); *F21S 45/48* (2018.01); *F21S 45/50* (2018.01)

(58) Field of Classification Search
CPC ..... H05B 41/288; F21V 25/00; F21V 7/0066; F21S 48/1109; F21S 48/328; F21S 45/50;
(Continued)

(56) References Cited

U.S. PATENT DOCUMENTS 2,252,476 A * 8/1941 Wright ...................... H01J 5/40
174/59
5,584,575 A * 12/1996 Fickel ....................... F21S 8/02
362/147

(Continued)

FOREIGN PATENT DOCUMENTS

DE         10224004 A1   12/2002
DE     102006004691 A1    8/2007
(Continued)

OTHER PUBLICATIONS

EPO as ISA, PCT/IB2014/064741, filed Jul. 9, 2014, "International Search Report and Written Opinion" dated Sep. 16, 2014, 110 pages.
(Continued)

*Primary Examiner* — Anh T Mai
*Assistant Examiner* — Fatima N Farokhrooz

(57) ABSTRACT

A headlight unit 10, 110 is described including a reflector 12 and a lamp mounting cavity 20. A lamp 30, 130 is mounted within the lamp mounting cavity 20. The lamp mounting cavity 20 is sealed by a cap 40 of partly flexible material. The cap 40 is provided as a heat spreader and dissipation element in thermal contact with the lamp 30.

19 Claims, 2 Drawing Sheets

(51) Int. Cl.
  *F21S 45/50* (2018.01)
  *F21S 45/48* (2018.01)
(58) Field of Classification Search
  CPC ........ F21S 41/141; F21S 41/143; F21S 41/19;
    F21S 41/192; F21S 41/194; F21S 41/196;
    F21S 41/198; F21S 41/30; F21S 41/32;
    F21S 41/321; F21S 41/322; F21S 41/33;
    F21S 41/332; F21S 41/338; B60Q 1/007
  See application file for complete search history.

(56) References Cited

U.S. PATENT DOCUMENTS

| | | | | |
|---|---|---|---|---|
| 5,744,901 | A * | 4/1998 | Friederichs | H01J 5/60 313/113 |
| 6,619,817 | B1 * | 9/2003 | Kataoka | B60Q 1/007 362/263 |
| 7,815,335 | B2 * | 10/2010 | Frick | F21L 4/045 362/187 |
| 2003/0058656 | A1 * | 3/2003 | Yamaguchi | B60Q 1/007 362/547 |
| 2006/0126333 | A1 * | 6/2006 | Goto | H01J 5/54 362/262 |
| 2008/0186704 | A1 * | 8/2008 | Chou | F21V 29/004 362/249.01 |
| 2009/0225563 | A1 * | 9/2009 | Yamamoto | F21S 41/17 362/519 |
| 2009/0280713 | A1 * | 11/2009 | Li | H01J 5/60 445/23 |
| 2010/0213809 | A1 | 8/2010 | Roehl et al. | |
| 2011/0051414 | A1 * | 3/2011 | Bailey | F21V 3/00 362/235 |
| 2011/0234356 | A1 * | 9/2011 | Rohl | H01F 27/2847 336/192 |
| 2011/0261572 | A1 * | 10/2011 | Watanabe | F21V 19/001 362/373 |
| 2013/0088836 | A1 * | 4/2013 | Kuroda | H01L 23/42 361/700 |
| 2014/0049164 | A1 * | 2/2014 | McGuire | H05B 33/08 315/149 |
| 2014/0301073 | A1 * | 10/2014 | Miskin | F21S 8/03 362/235 |

FOREIGN PATENT DOCUMENTS

| | | |
|---|---|---|
| DE | 102007059471 A1 | 6/2009 |
| DE | 102010048596 A1 | 4/2012 |
| JP | 1983096617 U | 6/1983 |
| JP | 04138651 A * | 5/1992 |
| JP | 002908908 B2 * | 6/1999 |
| JP | 2001236805 A | 8/2001 |
| JP | 2009146706 A | 7/2009 |
| JP | 2013030371 A | 2/2013 |
| WO | 2008036596 A1 | 3/2008 |

OTHER PUBLICATIONS

First Office Action dated Nov. 9, 2016, China Application No. 201480043114.2, 17 pages.
CN Second Office Action dated Jul. 11, 2017, China Patent Application No. 201480043114.2, 13 pages.
Extended European Search Report dated Dec. 11, 2013, European Application No. 13178539.6, 6 pages.
Office Action dated Feb. 6, 2018, Japan Application No. 2016-530410, 7 pages.
Third Office Action dated Jan. 16, 2018, China Patent Application No. 201480043114.2, 8 pages.

* cited by examiner

THERMAL FUNCTION OF HEADLIGHT SEALING CAP

CROSS-REFERENCE TO RELATED APPLICATIONS

The present application is a § 371 application of International Application No. PCT/EP2014/064741 filed on Jul. 9, 2014 and entitled "THERMAL FUNCTION OF HEADLIGHT SEALING CAP," which claims priority to European Application No. 13178539.6, filed Jul. 30, 2013. Both PCT/EP2014/064741 and EP13178539.6 are incorporated herein.

FIELD OF THE INVENTION

The invention relates to a headlight unit, in particular for a motor vehicle such as a car, truck or a motorcycle.

BACKGROUND OF THE INVENTION

Known headlight units include a reflector and a lamp mounted within a lamp mounting cavity. In operation, light is emitted from the lamp and reflected at the reflector to form a beam of desired illumination properties, in particular for front lighting of a motor vehicle.

In operation, electrical power supplied to the lamp is only partially converted into light, whereas the remaining portion heats up the lamp. Known incandescent lamps have a relatively low efficiency, so that an increased amount of heat is generated. However, incandescent lamps, in particular halogen lamps, can generally withstand higher temperatures. Also, in incandescent lamps, heat generated in the filament is efficiently radiated to the outside.

LED lamps have a higher efficiency, but are more sensitive to temperature. Heat is generated in a comparatively small space, and is not efficiently radiated. Thus, in particular for headlight units with LED lamps, thermal management is important.

JP 2013030371A describes a headlamp for a motor vehicle. The headlamp comprises an LED and a driver circuit which are directly attached to a heat radiating portion. The driver circuit is sealed by a resin. The heat radiating portion comprises a front surface, an extension portion extending up to the LED, and a radiation fin formed in a rear surface.

DE 10224004 A1 discloses a headlight unit comprising a reflector and a lamp. The lamp comprises a driver and a heat sink 12 mounted at the driver. The lamp is mounted in a cavity of the reflector. The cavity is sealed by a flexible cap.

SUMMARY OF THE INVENTION

It may be considered an object to provide a headlight unit of simple construction and handling that can assist in thermal management of the lamp.

This object is achieved by a headlight unit according to claim 1. Dependent claims refer to preferred embodiments of the invention.

In the context of novel LED lamps, the present inventors have considered construction and mounting of known headlight units originally intended to be used with halogen lamps. Mounting cavities provided at a reflector, may be closed off by a rubber cap as such that the mounting cavity and the lamp mounted within are sealed against the motor compartment of the motor vehicle and protected from dirt and moisture.

It is one underlying idea of the invention to use a sealing cap for the mounting cavity as a heat spreader and dissipation element.

The headlight unit according to the invention comprises a reflector with a lamp mounting cavity and a lamp mounted therein. The reflector may be a concave reflector and the mounting cavity may be provided such that a burner of the lamp comprising the actual light emitting element is positioned within the reflector, while a base of the lamp may be mounted at least partially outside of the reflector. The lamp may be a halogen lamp, but preferably is an LED lamp, where the light emitting element is comprised of one or more semiconductor lighting elements, such as LEDs or OLEDs (for simplicity here jointly referred to as LEDs).

According to one aspect, the lamp mounting cavity is sealed by a cap that is made at least partly of a flexible material. The flexibility of the cap provides that it can be easily installed, uninstalled and re-installed, e.g. for replacing the lamp, while still providing a seal for the lamp mounting cavity. The seal preferably protects the lamp mounting cavity from intrusion of water and/or dust. As will become apparent in connection with the preferred embodiments, the lamp mounting cavity may e.g. comprise an outer cavity wall, and the cap may be provided in sealing contact with the wall, e.g. as a sealing ring around it.

According to one aspect of the invention, the cap is provided as a heat spreader and dissipation element, and is in thermal contact with the lamp. The cap in this case may act as a heat spreader and dissipation element if it has overall sufficient thermal conductivity, or at least parts thereof have sufficient thermal conductivity to spread heat generated at the lamp. The improved thermal conductivity provides that heat from the lamp is spread by heat conduction within the cap. As a result of the relatively large surface of the cap, heat will be efficiently dissipated to the environment.

As will become apparent in connection with preferred embodiments, the thermal conductivity of the cap, which is made at least partly of a flexible material, may be obtained by using a flexible material of sufficiently high heat conductivity, and/or by providing one or more heat conduction elements, which may e.g. be embedded within a flexible material.

The thermal contact between the cap acting as a heat spreader and dissipation element and the lamp involves that either the cap directly contacts a part of the lamp, e.g. the lamp base, or that thermal contact is provided by an intermediate heat conduction element of good thermal conductivity.

The headlight unit according to the invention thus provides a simple construction, where the cap as a part that has a sealing function now serves a further purpose as a heat spreader and dissipation element. This provides for a compact arrangement. Handling for installation and exchange of the lamp within the reflector is simple.

The improved heat spreading function of the cap is particularly advantageous for LED lamps.

According to one preferred aspect, the cap may have an overall thermal conductivity of more than 50 W/mK. Further preferred, the thermal conductivity may be equal to or greater than 70 W/mK, particularly preferred ≥100 W/mK. While known flexible sealing materials such as natural rubber, polyurethane rubber or silicone rubber have a thermal conductivity of only 1 W/mK or even significantly below, there are graphite based materials available with a thermal conductivity of e.g. 140 W/mK or above. Such materials may consist of graphite, or of graphite embedded in plastics, either as macroscopic graphite elements or as plastic materials with graphite filler. These materials may be used for the cap to provide the heat spreader and dissipation function.

Alternatively, or in addition to a flexible material of good heat conduction, the cap may comprise at least one heat conduction element, which may e.g. embedded within a flexible material. The embedded heat conduction element may be e.g. a single element, e.g. made of metal such as aluminum or preferably copper, which may have any desired shape fitting within the cap, such as e.g. a ring shape, plate etc. Alternatively, a plurality of metal bodies may be embedded. For example, thin metal plates, e.g. made out of Cu or Al may be provided. In one aspect, heat conduction elements may be provided of elongated shape and arranged radially within the cap, i.e. extending from a center to the periphery thereof, to improve heat conduction away from the center which may be in thermal contact with the lamp. In another aspect, one or more mats of wires or fibers, e.g. made from graphite, carbon or metal such as Cu or Al may be embedded.

According to one preferred aspect, the cap may comprise a plurality of heat conduction elements embedded within a flexible material, such as e.g. metal, graphite or carbon heat conduction elements. These may be provided e.g. as fibers, particles or in other form, contributing to the overall thermal conductivity of the cap.

The lamp may be comprised of a burner with one or more lighting elements, and a base with mechanical fixing and/or electrical connection means. In particular, the base may be arranged in thermal contact, especially preferred direct contact, with the cap.

According to one preferred embodiment of the invention, the lamp comprises one or more LED lighting elements. The driver circuit may then be provided within the headlight unit to supply electrical power to the LED lighting elements. It is particularly preferred to provide the driver circuit in thermal contact with the cap. In this way, not only heat generated at the LED lighting elements, but also heat generated at the driver may be dissipated through the cap.

According to one embodiment, the driver circuit may be provided as part of the lamp. In particular, it may be provided within a base of the lamp. It is then preferred that the cap comprises a cavity, which is shaped and arranged to at least partly receive the base of the lamp therein, particularly preferred in direct contact.

According to an alternative embodiment, the driver circuit may be provided independently of the lamp, and may be at least partially embedded within the cap. The lamp in this case is then electrically and thermally connected to the driver. Thus, heat generated by the driver arranged in good thermal contact with the cap through the imbedding, is well dissipated by the cap. Additionally, heat generated by the lamp is conducted through the driver to be dissipated by the cap.

According to one preferred embodiment, the cap may be comprised of a back cover of e.g. flat, rounded shape, and a sealing ring projecting from the back cover. The sealing ring is provided to sealingly engage e.g. a housing at the neck of the reflector to provide a seal for the mounting cavity. The back cover is preferably in thermal contact with the lamp and/or a driver circuit.

These and other aspects of the invention will be apparent from and elucidated with reference to the embodiments herein after.

DETAILED DESCRIPTION OF EMBODIMENTS

Figure 1:
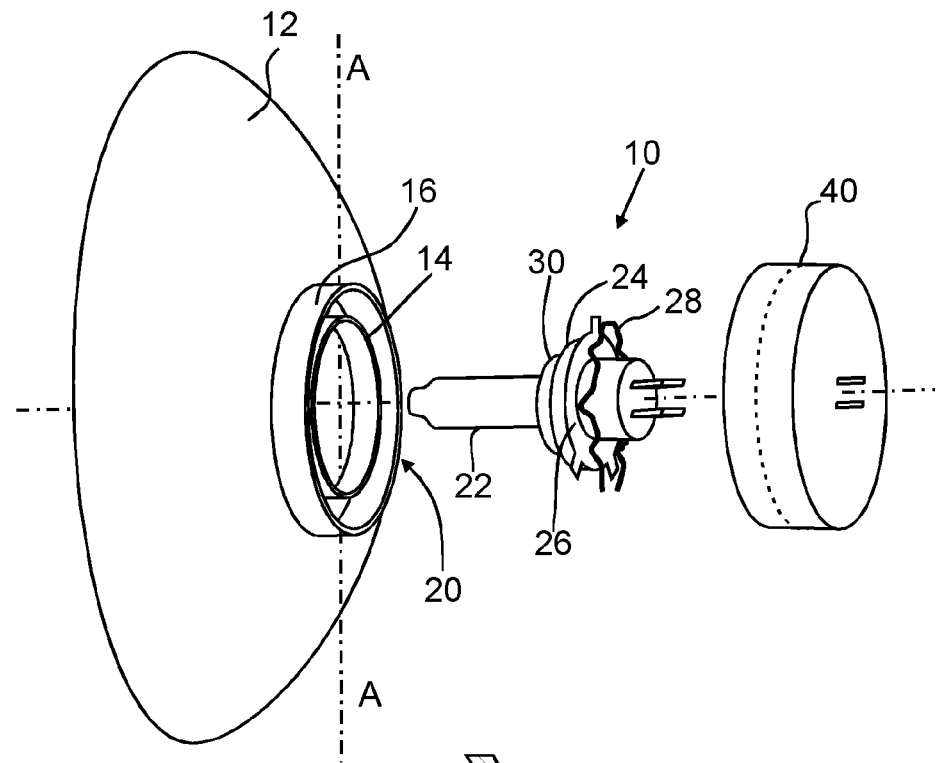
FIG. 1 shows a perspective exploded view of a first embodiment of a headlight unit.
Figure 2:
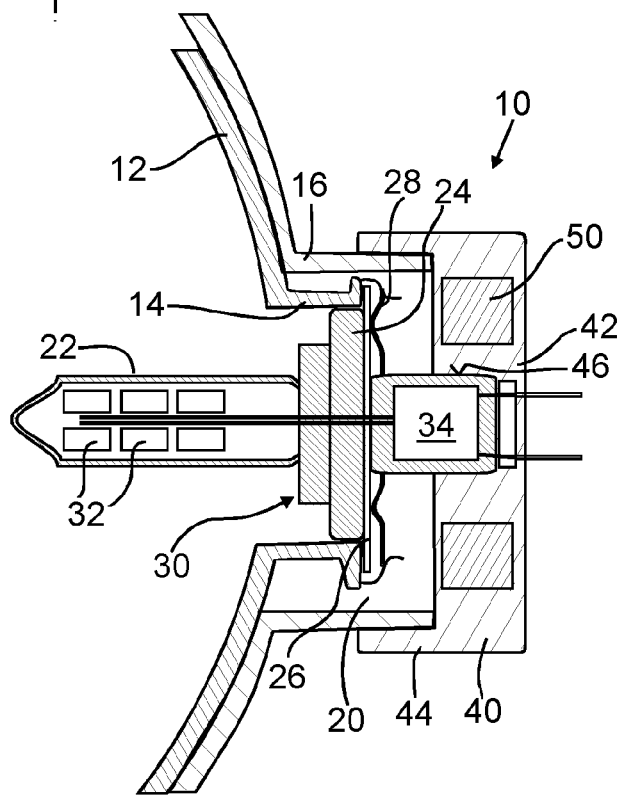
FIG. 2 shows a sectional view of the embodiment of FIG. 1 with the section taken along line A . . . A.

A first embodiment of a headlight unit 10 as shown in FIG. 1, FIG. 2 comprises a bowl-shaped reflector 12 with a reflector neck 14. An outer reflector housing forms a cylindrical wall 16 around the reflector neck 14.

The reflector neck 14 and the cylindrical wall 16 define a mounting cavity 20 for a lamp 30. The lamp 30 is comprised of a burner 22 and a base 24 including a reference ring 26 with radial reference protrusions.

In the mounting position shown in the sectional view of FIG. 2, the lamp 30 is positioned with the burner 22 projecting into the interior of the reflector 12, and the lamp base 24 positioned within the mounting cavity 20. The reference ring 26 is fixed to the reflector neck 14 by a mounting spring 28. The reference protrusions provide exact alignment of the lamp position and orientation relative to the reflector 12.

The mounting cavity 20 is closed off by a cap 40. As visible from the sectional view of FIG. 2, the cap 40 is comprised of a round plate-shaped back cover 42 provided in one piece with a sealing ring 44. The sealing ring 44 flexibly surrounds the cylindrical wall 16 of the mounting cavity 20, thereby sealing the mounting cavity 20 e.g. against dust, moisture etc.

In the example shown, the lamp 30 is an LED lamp comprising (only symbolically shown) a plurality of LED elements 32 within the burner 22, electrically connected to a driver circuit 34 provided within the lamp base 24. The driver circuit 34 is supplied via the shown plug connector to on-board electrical power from the motor vehicle and converts the supply voltage to an electrical voltage and current as necessitated by the LEDs 32 for operation.

The cap 40 is provided as heat spreader and dissipation element for heat generated by the lamp 30 in operation, i.e. heat generated at the LEDs 32 and within the driver circuit 34. As visible from FIG. 2, the cap 40 comprises a cavity 46 formed in the back cover 42. A part of the base 24 of the lamp 30, and in particular the part where the driver circuit 34 is located, is received within the cavity 46, which is of a corresponding shape and size such that the walls of the cavity 46 are in close contact with the outer surface of the lower parts of the lamp base 24.

Thus, the lamp base 24 is in good thermal contact with the cap.

The cap 40 is made of a flexible material, which allows for sealing at the sealing ring 44, but at the same time provides good heat conduction to fulfill the heat spreader and dissipation function. Embedded within the neck cover 42 is a copper ring 50, which serves to increase heat conduction and dissipation.

The flexible material forming the sealing ring 44 and embedding the metal ring 50 has increased thermal conductivity due to embedded metal fibers (not shown).

Figure 3:
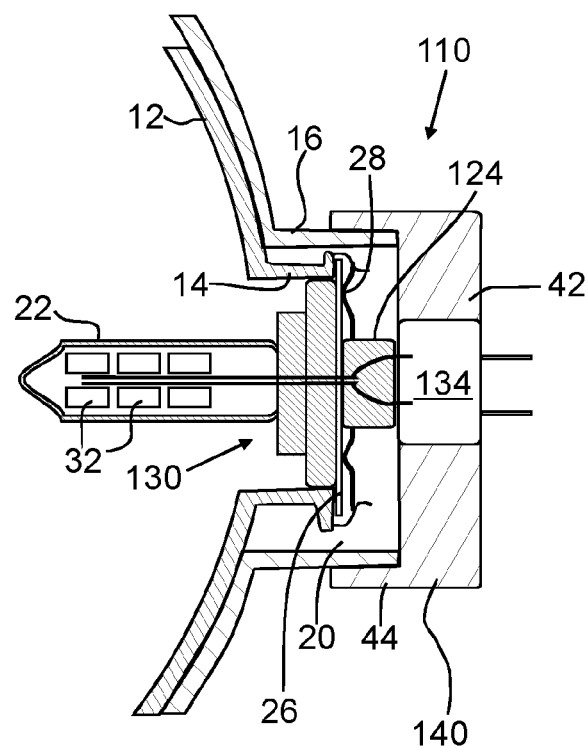
FIG. 3 shows a sectional view of a second embodiment of a headlight unit.

FIG. 3 shows an alternative embodiment of a headlight unit 110. Since the headlight unit 110 corresponds in large parts to the first embodiment of a headlight unit 10, like parts are designated by like reference numerals. In the following, only the differences between the embodiments will be further explained.

In the second embodiment, a cap 140 is provided which includes a driver circuit 134. A lamp 130 comprises a shortened base 124, providing only an electrical connection to the LEDs 32.

In the mounting position shown in FIG. 3, the cap 140 seals the mounting cavity 20. The lamp base 124 is electrically coupled via a plug connection to the driver circuit 134 embedded within the back cover 42 of the cap 140.

The cap 140 is made out of a synthetic rubber material with embedded carbon heat conduction particles. Thus, the material retains flexibility and still provides good heat conduction to dissipate heat from the integrated driver circuit 134, as well as heat from the burner 22 conducted through the lamp base 124.

In both the first and second embodiment, the lamps 30, 130 can be easily installed within the reflector 12 by inserting the burner 22 into the reflector neck 14 and fixing the reference ring 26 to the reflector neck 14 with the spring 28. Thereafter, the mounting cavity 20 is sealed by the flexible caps 40, 140, which are provided in close contact and therefore provide good heat conduction for heat generated by the LEDs 32. In particular, heat generated within the electrical driver circuit 34, 134 may be dissipated by the heat spreader and dissipation material of the caps 40, 140. The lamp 30, 130 may easily be exchanged by removing the caps 40, 140.

While the invention has been illustrated and described in detail in the drawings and forgoing description, such illustration and description are to be considered illustrative or exemplary and not restrictive; the invention is not limited to the disclosed embodiments.

For example, the cap 40, 140 may be provided of different shape. To improve heat conduction and dissipation, other metal elements besides the ring 50 shown in FIG. 2 may be embedded within the cap 40, 140.

The cap may be made out of a variety of different materials and with different embedded structures to achieve the overall good heat conduction and, in consequence of distributing the heat over a large surface area, good heat dissipation. Preferred are graphite based flexible materials, or thin metal caps made of Cu and/or Al. A further example may be e.g. a twined Cu or Al mat.

Other variations to the disclosed embodiments can be understood and effected by those skilled in the art in practicing the claimed invention, from a study of the drawings, the disclosure, and the appending claims. In the claims "comprising" does not exclude other elements or steps, and the indefinite article "a" or "an" does not exclude a plurality. The mere fact that certain measures are recited in mutually different dependent claims, or are explained above in mutually different embodiments, does not indicate that a combination of these measures cannot be used to advantage. Any reference signs in the claims should not be construed as limiting the scope.

The invention claimed is:

1. Headlight unit including:
   a reflector with a reflector neck;
   a lamp mounting cavity provided at said reflector neck;
   a lamp mounted within said lamp mounting cavity;
   an outer reflector housing with a cylindrical wall and a peripheral portion extending from said cylindrical wall, said peripheral portion being in contact with said reflector, said cylindrical wall being around said reflector neck to form concentric rings; and
   a cap integrally formed in a single piece of at least partly flexible material devoid of any additional sealing element for fixing said cap, wherein:
   said cap extends to and flexibly surrounds said cylindrical wall to close off said lamp mounting cavity sealing said mounting cavity against dust and moisture,
   said cap is dismountable from said cavity separate from said lamp,
   said cap is provided as a heat spreader and dissipation element in thermal contact with said lamp, and
   said cap has a thermal conductivity of more than 50 W/mK.

2. Headlight unit according to claim 1, wherein said cap comprises a flexible material with at least one embedded heat conduction element.

3. Headlight unit according to claim 1, wherein said cap comprises a flexible material with embedded metal, graphite or carbon heat conduction elements.

4. Headlight unit according to claim 1, wherein said lamp comprises a burner with one or more lighting elements, and also comprises a base with mechanical fixing means and electrical connection means, wherein said base is in thermal contact with said cap.

5. Headlight unit according to claim 1, wherein said lamp comprises one or more LED lighting elements, said headlight unit further comprising:
   a driver circuit provided to supply electrical power to said LED lighting element, wherein said driver circuit is arranged to be in thermal contact with said cap.

6. Headlight unit according to claim 1, wherein said cap comprises a back cover and a sealing ring projecting from said back cover, said sealing ring flexibly surrounding said lamp mounting cavity.

7. Headlight unit according to claim 2, wherein said cap comprises a back cover and a sealing ring projecting from said back cover, said sealing ring flexibly surrounding said lamp mounting cavity, and said heat conduction element comprises metal fibers and said back cover further comprises a copper ring positioned within said back cover.

8. Headlight unit according to claim 5, wherein
   said driver circuit is provided within a base of said lamp, wherein said cap comprises a cavity, and wherein at least a part of said base is received within said cavity.

9. Headlight unit according to claim 5, wherein
   said driver circuit is provided at least partially embedded within said cap,
   and wherein said lamp is electrically and thermally connected to said driver circuit.

10. Headlight unit according to claim 5, wherein said cap comprises a back cover and a sealing ring projecting from said back cover, said sealing ring flexibly surrounding said lamp mounting cavity, and said driver unit is in physical contact with said back cover.

11. Headlight unit according to claim 6, wherein said outer reflector housing is disposed between said reflector and said sealing ring, and in contact with said sealing ring.

12. Headlight unit according to claim 6, wherein said back cover is plate-shaped.

13. Headlight unit according to claim 11, wherein said cylindrical wall of said outer reflector housing is positioned on an outer edge of said lamp mounting cavity and defining a back opening of said lamp mounting cavity.

14. Headlight unit according to claim 13, wherein an inner side of said sealing ring contacts and seals an outer side of said cylindrical wall.

15. Headlight unit according to claim 13, wherein said back cover covers and seals said back opening.

16. Headlight unit according to claim 13, wherein an inside of said back cover faces said back opening and an exterior side of said back cover opposite said inner side faces an exterior of said headlight unit.

17. Headlight unit according to claim 13, wherein an area of said back opening is smaller than a surface area of an outer surface of said cap.

18. Headlight unit according to claim 14, wherein an exterior side of said sealing ring opposite said inner side faces an exterior of said headlight unit.

19. Headlight unit according to claim 16, wherein said inside of said back cover is in direct contact with said lamp mounting cavity.

* * * * *